(12) United States Patent
Gromotka

(10) Patent No.: US 12,393,055 B2
(45) Date of Patent: *Aug. 19, 2025

(54) METHOD FOR MANUFACTURING A SPECTACLE LENS ACCORDING TO AT LEAST ONE DATA SET OF EDGING DATA

(71) Applicant: Carl Zeiss Vision International GmbH, Aalen (DE)

(72) Inventor: Jeremias Gromotka, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 621 days.

This patent is subject to a terminal disclaimer.

(21) Appl. No.: 17/840,696

(22) Filed: Jun. 15, 2022

(65) Prior Publication Data

US 2022/0308360 A1   Sep. 29, 2022

Related U.S. Application Data

(63) Continuation of application No. 16/599,462, filed on Oct. 11, 2019, now Pat. No. 11,391,963, which is a
(Continued)

(30) Foreign Application Priority Data

Apr. 13, 2017   (EP) ..................... 17166517

(51) Int. Cl.
  *G02C 7/02*   (2006.01)
  *G01N 21/958*   (2006.01)
  (Continued)

(52) U.S. Cl.
  CPC ........... *G02C 7/024* (2013.01); *G01N 21/958* (2013.01); *G02C 7/028* (2013.01); *G02C 7/06* (2013.01);
  (Continued)

(58) Field of Classification Search
  CPC . G02C 7/04; G02C 7/028; G02C 7/06; G02C 2202/06; G01N 21/958; G01N 2021/9583; G02B 1/116
  (Continued)

(56) References Cited

U.S. PATENT DOCUMENTS 3,988,068 A   10/1976   Sprague
5,717,781 A   2/1998   Ebel et al.
(Continued)

FOREIGN PATENT DOCUMENTS

CA   2348075 A1   4/2000
CN   1285910 A   2/2001
(Continued)

OTHER PUBLICATIONS

Office Action by the Chinese Patent Office (CNIPO) issued in CN 202111188160, which is a counterpart hereof, mailed on Oct. 31, 2023, and English translation thereof.
(Continued)

*Primary Examiner* — Sharrief I Broome
(74) *Attorney, Agent, or Firm* — Tautz & Schuhmacher LLC; Georg Hasselmann

(57) ABSTRACT

A method for manufacturing a spectacle lens according to at least one data set of edging data and a computer program product with instructions for performing the method are disclosed. A spectacle lens blank, semifinished spectacle lens product, or a finished spectacle lens product is inspected for defects and compared to a data set to determine if it can be manufactured into an edged finished spectacle lens that fits into a specific spectacle frame such that the defect is not present in the edged finished spectacle lens.

14 Claims, 6 Drawing Sheets

Related U.S. Application Data continuation of application No. PCT/EP2018/059490, filed on Apr. 13, 2018.

(51) Int. Cl.
  *G02B 1/116* (2015.01)
  *G02C 7/06* (2006.01)

(52) U.S. Cl.
  CPC ...... *G01N 2021/9583* (2013.01); *G02B 1/116* (2013.01); *G02C 2202/06* (2013.01)

(58) Field of Classification Search
  USPC .................................................... 351/159.41
  See application file for complete search history.

(56) References Cited

U.S. PATENT DOCUMENTS

| | | | |
|---|---|---|---|
| 5,995,213 | A | 11/1999 | Davis et al. |
| 6,047,082 | A | 4/2000 | Rhody et al. |
| 7,728,962 | B2 | 6/2010 | Hornauer et al. |
| 8,425,035 | B2 | 4/2013 | von Blanckenhagen |
| 8,591,026 | B2 | 11/2013 | Conte et al. |
| 9,797,804 | B2 | 10/2017 | Glasenapp et al. |
| 10,976,572 | B2 | 4/2021 | Dangelmaier et al. |
| 2003/0169397 | A1 | 9/2003 | Reichow et al. |
| 2007/0115429 | A1* | 5/2007 | Divo ................ G02C 13/005 351/159.69 |
| 2010/0141729 | A1* | 6/2010 | Petsch ................... B41M 5/267 347/225 |
| 2010/0141893 | A1 | 6/2010 | Altheimer et al. |
| 2010/0283999 | A1* | 11/2010 | Takeyama ............ G01N 21/958 356/239.2 |
| 2013/0148111 | A1* | 6/2013 | Hanssen .............. G01M 11/081 356/124 |
| 2014/0300856 | A1 | 10/2014 | Dangelmaier et al. |
| 2014/0320803 | A1 | 10/2014 | Muradore et al. |
| 2014/0347626 | A1 | 11/2014 | Sahler et al. |
| 2016/0161760 | A1 | 6/2016 | Godot |
| 2017/0199395 | A1 | 7/2017 | Baudart et al. |
| 2017/0274490 | A1 | 9/2017 | Mechrez et al. |
| 2018/0195931 | A1 | 7/2018 | Lemaire et al. |
| 2020/0240871 | A1 | 7/2020 | Mathey et al. |

FOREIGN PATENT DOCUMENTS

| | | |
|---|---|---|
| CN | 201795916 U | 4/2011 |
| CN | 103930822 A | 7/2014 |
| CN | 103930823 A | 7/2014 |
| CN | 104040411 A | 9/2014 |
| CN | 105378544 A | 3/2016 |
| CN | 105916669 A | 8/2016 |
| DE | 10333426 A1 | 2/2005 |
| DE | 102008041869 A1 | 3/2010 |
| DE | 102011089704 A1 | 6/2013 |
| EP | 1116550 A1 | 7/2001 |
| EP | 1914540 A2 | 4/2008 |
| EP | 3002114 A1 | 4/2016 |
| GB | 201121019 D | 1/2012 |
| JP | 2008191186 A1 | 8/2008 |
| WO | 0155752 A1 | 8/2001 |
| WO | 2005017482 A1 | 2/2005 |
| WO | 2008089997 A1 | 7/2008 |
| WO | 2010109154 A1 | 9/2010 |
| WO | 2011117539 A1 | 9/2011 |
| WO | 2014177632 A1 | 11/2014 |
| WO | 2016055861 A1 | 4/2016 |

OTHER PUBLICATIONS

Office action by the European Patent Office issued in EP 21 192 282.8, which is a counterpoart hereof, mailed Jun. 7, 2024 (English-language machine translation attached).

DIN EN ISO 13666 (Ophthalmic optics—Spectacle lenses), dated Oct. 2013.

International Search Report issued in PCT/EP2018/059490, to which this application claims priority, and English-language translation thereof, mailed Jun. 22, 2018.

International Preliminary Examination Report issued in PCT/EP2018/059490, to which this application claims priority, and English-language translation thereof, mailed Jul. 25, 2019.

Office action by the European Patent Office issued in EP 17 166 517.7, to which this application claims priority, mailed Oct. 7, 2019.

Office action by the Chinese Patent Office issued in CN 201880039433. 4, which is a counterpart hereof, mailed Jan. 21, 2021, and English-language translation thereof.

Extended European Search Report issued in EP21192282.8, which is a counterpart hereof, mailed Jan. 4, 2022, and English-language translation thereof.

* cited by examiner

METHOD FOR MANUFACTURING A SPECTACLE LENS ACCORDING TO AT LEAST ONE DATA SET OF EDGING DATA

CROSS REFERENCE TO RELATED APPLICATIONS

This application is a continuation application of U.S. patent application Ser. No. 16/599,462, filed Oct. 11, 2019, which is a continuation of international application PCT/EP2018/059490, filed Apr. 13, 2018, which claims priority to European patent application EP 17166517.7, Apr. 13, 2017, all of which are hereby incorporated by reference in their entireties.

TECHNICAL FIELD

The present disclosure relates to a method for manufacturing a spectacle lens made from a spectacle lens blank, spectacle lens semifinished product, or spectacle lens finished product, according to at least one data set of edging data.

BACKGROUND

Spectacle lenses are distinguished between spectacle lenses having no nominal dioptric power and corrective spectacle lenses, i.e., spectacle lenses having dioptric power. According to DIN EN ISO 13666, dioptric power is the collective term for the focusing and the prismatic power of a spectacle lens.

In the case of corrective spectacle lenses, a distinction is also drawn between monofocal spectacle lenses and multifocal spectacle lenses. A monofocal spectacle lens is a spectacle lens in which there is only one dioptric power. A multifocal spectacle lens is a spectacle lens in which there are two or more different regions having different dioptric powers in the spectacle lens.

The shape that the spectacle lens has to adopt on its front surface and/or back surface to obtain the desired optical correction is determined to a crucial degree by the material from which the spectacle lens is manufactured. The most important parameter here is the refractive index of the material used. While spectacle lenses used to be manufactured predominantly from mineral glasses, especially crown glasses (Abbe number>55) and flint glasses (Abbe number<50), spectacle lenses made from a multitude of organic materials have now become available.

Spectacle lenses based on mineral glasses are regularly produced by mechanically abrasive machining of a spectacle lens blank.

Spectacle lenses based on organic materials are cast, for example, as spectacle lens semifinished products with spherical, rotationally symmetrically aspherical, or progressive front surfaces in mass production in prototypes with front surface and back surface mold shells that are spaced apart from one another by a sealing ring, forming a cavity, as described, in JP 2008191186 A, for example. The back surface of a spectacle lens semifinished product thus manufactured can, for example, be machined in a mechanically abrasive manner to obtain a spectacle lens finished product.

EP1116550A1 describes a method for manufacturing a spectacle lens in which a marking comprising product information is applied in that region of the spectacle lens which is cut away during the final manufacture of the spectacle lens.

EP3002114A1 describes a method in which the position to be processed on at least two surfaces of the spectacle lens blank is chosen according to criteria of the most cost-effective manufacture.

SUMMARY

It is an object of the present disclosure to provide a method for manufacturing a spectacle lens, which allows the utilization of preliminary products formerly identified as rejects or of intermediate products formerly identified as rejects for the manufacture of a spectacle lens.

This object is achieved according to the disclosure by providing a method for manufacturing a spectacle lens according to at least one data set of edging data. Exemplary embodiments of this method are specified below.

Further, this object is achieved by providing a computer program product for performing the method for manufacturing a spectacle lens according to at least one data set of edging data.

Accordingly, this object is achieved by a method for manufacturing a spectacle lens according to at least one data set of edging data, wherein the method comprises the following steps:

a. providing a spectacle lens blank,
b. identifying at least one defect present of the spectacle lens blank,
c. separating the spectacle lens blanks provided in step a. into spectacle lens blanks having at least one defect identified in step b. and spectacle lens blanks without any defect identified in step b.,
d. detecting the position and/or the size of the at least one defect identified in step b.,
e. providing at least one data set of prescription data,
f. providing at least one data set of edging data,
g. comparing the at least one data set of prescription data from step e. with the at least one defect of the spectacle lens blank that was identified in step b. and detected in step d.,
h. comparing the at least one data set of edging data from step f. with the at least one defect of the spectacle lens blank that was identified in step b. and detected in step d.,
i. assigning the spectacle lens blank to a category depending on the comparison from step g. and depending on the comparison from step h., or
j. providing a spectacle lens semifinished product, which is optionally coated on the optically effective target surface,
k. identifying at least one defect present of the spectacle lens semifinished product and/or identifying at least one defect present of the optionally present coating of the optically effective target surface of the spectacle lens semifinished product,
l. separating the spectacle lens semifinished products provided in step j. into spectacle lens semifinished products having at least one defect identified in step k. and spectacle lens semifinished products without any defect identified in step k.,
m. detecting the position and/or the size of the at least one defect identified in step k.,
n. providing at least one data set of edging data,
o. optionally providing at least one data set of prescription data, p. comparing the at least one data set of edging data from step n. with the at least one defect of the spectacle lens semifinished product that was identified in step k. and detected in step m., q. optionally comparing the at least one data set of prescription data from step o. with the at least one defect of the spectacle lens semifinished product that was identified in step k. and detected in step m., r. assigning the spectacle lens semifinished product to a category depending on the comparison from step p. and optionally depending on the comparison from step q., or s. providing a spectacle lens finished product, which is optionally coated on at least one of the optically effective target surfaces, t. identifying at least one defect present of the spectacle lens finished product and/or identifying at least one optionally present defect of the optionally present coating of at least one of the optically effective target surfaces of the spectacle lens finished product, u. separating the spectacle lens finished products provided in step s. into spectacle lens finished products having at least one defect identified in step t. and spectacle lens finished products without any defect identified in step t., v. detecting the position and optionally the size of the at least one defect identified in step t., w. providing at least one data set of edging data, x. optionally providing at least one data set of prescription data, y. comparing the at least one data set of edging data from step w. with the at least one defect of the spectacle lens finished product that was identified in step t. and detected in step v., z. optionally comparing the at least one data set of prescription data from step x. with the at least one defect of the spectacle lens finished product that was identified in step t. and detected in step v., aa. assigning the spectacle lens finished product to a category depending on the comparison from step x. and optionally depending on the comparison from step z.

In each case in the second step of the method according to the disclosure, i.e., proceeding from a spectacle lens blank step b., proceeding from a spectacle lens semifinished product step k., and proceeding from a spectacle lens finished product step r., identifying at least one optionally present defect of the spectacle lens blank, of the spectacle lens semifinished product and respectively of the spectacle lens finished product typically comprises identifying i) on and/or in a spectacle lens blank and respectively i) on and/or in a spectacle lens semifinished product and/or ii) on and/or in at least one optionally present coating of the optically effective target surface of the spectacle lens semifinished product and respectively i) on and/or in a spectacle lens finished product and/or ii) on and/or in the optionally present coating of at least one optically effective target surface of the spectacle lens finished product.

The optionally present at least one defect is typically a local, cosmetic defect. A cosmetic defect is a defect which has no or only an insignificant adverse effect on the dioptric power of the finished processed and edged spectacle lens. These may be e.g., relatively small mechanical defects such as, for instance, scratches, spalling, bumps, warpage or infiltrations, inclusions such as, for instance, dust particles or blisters or production-dictated defects such as, for instance, striations, lacquer seams or color defects in the coating or tinting.

In the context of this disclosure, the starting point for the manufacture of spectacle lenses according to at least one data set of edging data is a spectacle lens blank or a spectacle lens semifinished product or a spectacle lens finished product.

A spectacle lens semifinished product, also referred to as semifinished product, is a spectacle lens blank whose front surface or back surface is already the final optically effective target surface. The optically effective target surface of a spectacle lens that is intended for arrangement on the object side is referred to as the front surface; the optically effective target surface of a spectacle lens that is intended for arrangement on the eye side is called the back surface. The surface between them, which either directly forms an edge or indirectly adjoins the front surface at one end and the back surface at the other end via an edge surface, is referred to as cylinder edge surface. The terms front surface, back surface, and cylinder edge surface are used analogously in each case for a spectacle lens blank, a spectacle lens semifinished product and a spectacle lens finished product. In a spectacle lens blank, neither the front surface nor the back surface already corresponds to the final, optically effective target surfaces.

A spectacle lens finished product, also referred to as finished product or finished spectacle lens, is a spectacle lens whose front surface and back surface are already the final, optically effective target surface. A spectacle lens finished product can, for example, either be cast in a mold with a front surface mold shell and a back surface mold shell spaced apart from one another with a sealing ring, forming a cavity, or alternatively be manufactured by means of an Rx process. Rx process is understood to mean the application-specific prescription manufacture in accordance with the prescription data for a wearer of spectacles. A spectacle lens semifinished product serves as starting material for the Rx process. A spectacle lens finished product is generally also edged, i.e., brought to the final shape and size matched to the spectacle frame by edge processing.

The spectacle lens blank, the spectacle lens semifinished product and respectively the spectacle lens finished product can be based in each case on a base material comprising a mineral glass or an organic material. Some examples of these base materials are listed in Table 1 below.

TABLE 1

Examples of base materials for spectacle lens blanks, spectacle lens semifinished products and respectively spectacle lens finished products

| Trade name | Base material | Average refractive index n* | Abbe number v* |
|---|---|---|---|
| CR 39, CR 330, CR 607, CR 630 RAV 700, 7NG, 7AT, 710, 713, 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan | Polycarbonate (PC) | 1.590 | 29 |
| MR 6 | Polythiourethane | 1.598 | |
| MR 8 | Polythiourethane | 1.598 | 41 |
| MR 7 | Polythiourethane | 1.664 | 32 |
| MR 10 | Polythiourethane | 1.666 | 32 |
| MR 174 | Polyepisulfide | 1.738 | 32 |
| MGC 1.76 | Polyepisulfide | 1.76 | 30 |
| | Mineral 1.5 | 1.525 | 58 |
| | Mineral 1.6 | 1.604 | 44 |

*Based on sodium D line

The optically effective target surface of the spectacle lens semifinished product or respectively at least one optically effective target surface of the spectacle lens finished product can be provided with at least one functional layer. Such functional layers are layers that equip the respective surface with predetermined properties which are advantageous for the wearer of spectacles. Such advantageous properties also include, besides optical properties such as e.g., antireflection, reflection, light polarization, phototropy, etc., mechanical properties such as hardening, reducing the adherence of dirt or fogging, etc., and/or electrical properties such as shielding against electromagnetic radiation, conduction of electric current, etc., and/or other physical or chemical properties. Examples of functional coatings are gathered e.g., from the documents WO 10/109154 A1, WO 01/55752 A1, and DE 10 2008 041 869 A1.

In the context of this disclosure, a data set of edging data is understood to mean geometric data which allow a spectacle lens finished product to be fitted by grinding by means of an automatic grinding machine, for example, such that it can be inserted into a desired spectacle frame with an accurate fit. Typically, a data set of edging data is understood to mean in the context of this disclosure geometric data which allow a spectacle lens finished product to be inserted into a desired spectacle frame with an accurate fit. Alternatively, a data set of edging data is understood to mean the boxing system according to DIN EN ISO 13666:2013-10, paragraph 5.1. According to DIN EN ISO 13666:2013-10, paragraph 5.1, the boxing system is the system of dimensions and definitions which is based on a rectangle formed by the horizontal and vertical tangents to the outermost edges of the spectacle lens or spectacle lens blank. The data sets of edging data described in accordance with preceding definitions are in each case a concrete data set of edging data.

In the context of this disclosure, the data set of prescription data includes the parameters which are required for the optical correction effect of a spectacle lens and which serve, if appropriate, to correct the defective vision of the wearer of spectacles. Optical correction effect is understood to mean spherical correction, astigmatic correction and correction of the axis position and optionally correction by a prism with a base setting. This optical correction effect is conventionally implemented for distance vision in monofocal spectacle lenses. In the case of multifocal spectacle lenses, for example bifocal spectacle lenses or progressive spectacle lenses, the optical correction effect for distance vision and/or for near vision may in each case include a spherical correction, an astigmatic correction, a correction of the axis position and optionally a correction by a prism with a base setting, typically in the near-vision portion. The data set of prescription data is generally determined by an ophthalmologist or optician in the course of subjective refraction measurement and incorporated in a vision aid prescription that can then be taken as a basis for producing personalized corrective spectacles. The data set of prescription data within the meaning of this disclosure can also serve for manufacturing spectacle lenses with no optical correction effect. The data set of prescription data is thus typically a concrete data set of prescription data.

The method according to the disclosure comprises, in the last method step in each case, the assignment of the spectacle lens blank or respectively of the spectacle lens semifinished product or respectively of the spectacle lens finished product to a category, wherein this assignment is effected depending on the comparison from steps g. and h. carried out for the spectacle lens blank, or respectively the comparison from step o. carried out for the spectacle lens semifinished product, or respectively the comparison from step v. carried out for the spectacle lens finished product.

In this case, the category can be selected from:
Category 1:
The spectacle lens blank having at least one identified and position-determined defect is processed further according to at least one concrete data set of prescription data and according to at least one concrete data set of edging data, or
Category 2:
The spectacle lens semifinished product or respectively the spectacle lens finished product having respectively at least one, respectively identified and respectively position-determined defect is processed further according to at least one concrete data set of edging data and/or according to a concrete data set of prescription data, or
Category 3:
The spectacle lens blank or respectively the spectacle lens semifinished product or respectively the spectacle lens finished product having respectively at least one, respectively identified and respectively position-determined defect, according to at least one abstract data set of edging data, is included in an intermediate storage inventory, or
Category 4:
The spectacle lens blank or respectively the spectacle lens semifinished product or respectively the spectacle lens finished product having respectively at least one, respectively identified and respectively position-determined defect is rejected.

During the manufacture of spectacle lens blanks, at least one defect can occur within the spectacle lens blank. In the context of this disclosure, defects on at least one surface of a spectacle lens blank are not taken into account any further owing to the processing of both surfaces according to a data set of prescription data, typically a concrete data set of prescription data.

During the manufacture of spectacle lens semifinished products or respectively spectacle lens finished products, defects can occur on the optically effective target surface of the spectacle lens semifinished product or respectively on at least one of the optically effective target surfaces of the spectacle lens finished product or beneath same, i.e., within the spectacle lens semifinished product or respectively within the spectacle lens finished product. The optionally at least one coating present on the optically effective target surface of the spectacle lens semifinished product, or respectively the optionally at least one coating present on at least one of the optically effective target surfaces of the spectacle lens finished product can also have at least one defect. Hitherto spectacle lens blanks or respectively spectacle lens semifinished products or respectively spectacle lens finished products having at least one defect of the spectacle lens blank or respectively of the spectacle lens semifinished product or respectively of the spectacle lens finished product and/or of the coating of the optically effective target surface of the spectacle lens semifinished product or respectively of the coating of the at least one optically effective target surface of the spectacle lens finished product have generally been rejected.

According to category 1, at least one concrete data set of prescription data comprising the prescription data for a spectacle lens to be concretely manufactured, and also a concrete data set of edging data comprising the edging data for a spectacle lens to be concretely manufactured are provided.

The terms "concrete data set of prescription data" and "concrete data set of edging data" in category 2 should be understood analogously to the definition in category 1.

According to category 3, an abstract data set of edging data comprising possible edging data and/or possible boxing systems of a spectacle lens blank to be stored in an intermediate store or respectively of a spectacle lens semifinished product or respectively of a spectacle lens finished product is provided. An abstract data set of edging data includes edging data previously defining for example regions that will be removed with a specific probability during edging. In this regard, by way of example, in the case of a spectacle lens blank or respectively a spectacle lens semifinished product or respectively a spectacle lens finished product, it should be assumed that in the later nasal region of the spectacle lens blank or respectively spectacle lens semifinished product or respectively spectacle lens finished product more will be removed than in the later temporal region. Moreover, in the case of a defect in the edge region of a spectacle lens blank or respectively spectacle lens semifinished product or respectively spectacle lens finished product, for example a defect which is situated at a distance of a maximum of 7 mm, typically a maximum of 4 mm, more typically a maximum of 2 mm, particularly typically a maximum of 1 mm, as considered in each case from the plan view of a surface, with respect to the closest point of intersection of the surface with the cylinder edge surface, it should be assumed that this region will be removed during final edging. Provided that the spectacle lens blank or respectively the spectacle lens semifinished product or respectively the spectacle lens finished product thus no longer has any further defect besides the at least one defect in the edge region, the spectacle lens blank or respectively the spectacle lens semifinished product or respectively the spectacle lens finished product can be processed further according to one of categories 1, 2 or 3. In the context of the present disclosure, a concrete data set of edging data according to category 1 or 2 and an abstract data set of edging data according to category 3 are also referred to as data set of edging data.

The defects within a spectacle lens blank or within a spectacle lens semifinished product or within a spectacle lens finished product can be, for example, inclusions of foreign particles, air bubbles or striations. The defects on the optically effective target surface of a spectacle lens semifinished product or respectively on the at least one optically effective target surface of a spectacle lens finished product can be, for example, scratches, spalling, bumps, warpage or some other damage of at least one optically effective target surface. Such defects can arise for example during the removal of the spectacle lens semifinished product or of the spectacle lens finished product from the corresponding mold, for example as a result of the optically effective target surface of the spectacle lens semifinished product or respectively at least one optically effective target surface of the spectacle lens finished product sticking in each case to the mold. By way of example, craters can arise in this way. Defects that may arise during the removal from the mold, for example also as a result of parts of the mold sticking to the optically effective target surface of the spectacle lens semifinished product or respectively to the at least one optically effective target surface of the spectacle lens finished product, can in each case bring about prominences on the optically effective target surface. Alternatively, contaminants or residues sticking to the mold can cause adhering deposits or near-surface defects on the optically effective target surface of the spectacle lens semifinished product or respectively on the at least one optically effective target surface of the spectacle lens finished product.

The defects of the optionally present coating of the optically effective target surface of the spectacle lens semifinished product or respectively of the optionally present coating of at least one optically effective target surface of the spectacle lens finished product can be, for example, scratches, adhering deposits, lacquer seams, lacquer runoff traces, chipping, layer detachments, color defects and/or inclusions of foreign particles, for example.

The at least one defect of the spectacle lens blank or respectively of the spectacle lens semifinished product or respectively of the spectacle lens finished product and/or the at least one defect of the optionally present at least one coating of the optically effective target surface of the spectacle lens semifinished product or respectively of at least one of the optically effective target surfaces of the spectacle lens finished product can be detected visually, typically visually with the aid of test light. Alternatively, it is possible to carry out the detection of at least one defect with the aid of test light, typically in an automated manner, by means of a camera recording of the spectacle lens blank or respectively the spectacle lens semifinished product or respectively the spectacle lens finished product to be examined in each case, which camera recording is subsequently evaluated, typically in an automated manner, by means of a computer program. If the evaluation reveals that the at least one defect lies completely exclusively in the edge region of the spectacle lens blank or respectively of the spectacle lens semifinished product or respectively of the spectacle lens finished product, the corresponding spectacle lens blank or respectively the corresponding spectacle lens semifinished product or respectively the corresponding spectacle lens finished product is not rejected according to category 4. At least one defect in the edge region is considered here to be a defect which is situated completely on and/or below the respective surface in each case at a distance of typically a maximum of 6 mm, more typically of a maximum of 5 mm, particularly typically a maximum of 3 mm, and very particularly typically a maximum of 1.5 mm, from the respective cylinder edge surface. In this case, the distance is typically the shortest distance between the furthest inner point of the at least one defect on or below the surface, i.e., that point of the at least one defect which lies closest to the geometric midpoint or respectively of an axis, which runs parallel to the cylinder edge surface and through the geometric midpoint, of the spectacle lens blank or respectively of the spectacle lens semifinished product or respectively of the spectacle lens finished product, and the cylinder edge surface. If the at least one defect is situated outside the abovementioned edge region, the corresponding spectacle lens blank, the corresponding spectacle lens semifinished product or the corresponding spectacle lens finished product can be subjected to a visual inspection. Depending on the outcome of the visual inspection, the corresponding spectacle lens blank, the corresponding spectacle lens semifinished product or the corresponding spectacle lens finished product can then also be assigned to one of the categories 1, 2, 3, or 4. This visual inspection can also take place in an automated manner.

Furthermore, the at least one defect of an optionally present coating can be detected for example visually with the aid of rod light or a rod-shaped light source. If rod light or the rod-shaped light source is guided over the coated optically effective target surface of a spectacle lens semifinished product or of a spectacle lens finished product, the specular reflection of the rod light on the coated optically effective target surface is typically a curve corresponding to the coated optically effective target surface. If at least one defect of the coating is present, the specular reflection of the rod light may be displaced and/or interrupted, for example. The curve is then no longer continuously differentiable. In that case, too, the detection of the at least one defect, as already described above, can be carried out in an automated manner by means of a camera recording and can be evaluated in an automated manner by means of a computer program. The above-defined edge regions within which the presence of at least one defect does not lead to rejection according to category 4 are correspondingly applicable here. If at least one defect is situated outside the abovementioned edge region, a visual assessment can be carried out here, too, in order to assign the at least one spectacle lens blank, the at least one spectacle lens semifinished product or the at least one spectacle lens finished product to one of the categories 1, 2, 3, or 4.

The detection of the at least one defect of the spectacle lens blank or respectively of the spectacle lens semifinished product or respectively of the spectacle lens finished product and/or the at least one defect of the optionally present at least one coating of the optically effective target surface of the spectacle lens semifinished product or respectively of at least one of the optically effective target surfaces of the spectacle lens finished product is typically carried out by means of the method disclosed in WO 2014/177632 A1, in association with FIG. 1. Particularly typically, the detection of the at least one defect of the spectacle lens semifinished product or respectively of the spectacle lens finished product and/or the detection of the at least one defect of the optionally present at least one coating of the optically effective target surface of the spectacle lens semifinished product or respectively of at least one of the optically effective target surfaces of the spectacle lens finished product is carried out analogously to the method described in WO 2005/017482 A1, claim 1, for visualizing signature marks. Abovementioned methods for detecting at least one defect can be used in different phases of the production process.

In the case of category 1, the at least one concrete data set of prescription data and the at least one concrete data set of edging data, on the basis of the shape and size of the spectacle frame, determine the final shape of the spectacle lens which is to be produced and fits into the spectacle frame, i.e., of that spectacle lens which also includes the prescription data required for the wearer of spectacles and is optionally covered with at least one coating of at least one of the optically effective target surfaces. For this purpose, the final shape of the spectacle lens to be produced is positioned virtually on at least the front surface of the spectacle lens blank or the back surface of the spectacle lens blank in such a way that the at least one defect lies outside the spectacle lens to be produced after edging.

As an alternative or in addition to at least one concrete data set of edging data, the virtual positioning of the spectacle lens to be manufactured from a spectacle lens blank is carried out on the basis of a concrete data set of prescription data in the case of category 1.

In the case of category 2, too, the virtual positioning of the spectacle lens to be manufactured from a spectacle lens semifinished product or respectively a spectacle lens finished product is carried out on the basis of a concrete data set of prescription data as an alternative or in addition to at least one concrete data set of edging data.

In the case of category 3, the at least one abstract data set of edging data determines which spectacle lens blanks or respectively which spectacle lens semifinished products, which are optionally coated on the optically effective target surface, or respectively which spectacle lens finished products, which are optionally coated on at least one of the optically effective target surfaces, are stored as stock items in an intermediate store. The abstract data set of edging data of category 3 is typically defined such that according to experience and typically in line with respective spectacle frame fashion intermediately stored spectacle lens blanks or respectively spectacle lens semifinished products or respectively spectacle lens finished products can be used within a predetermined time t for producing a finished spectacle lens which fits into a spectacle frame. In this case, the value for t can be chosen for example depending on the available intermediate storage capacity. The abstract data set of edging data of category 3 is defined with further preference such that in each case, typically in line with respective spectacle frame fashion, typically at least 47%, more typically at least 54%, particularly typically at least 66% and very particularly typically at least 71% of the intermediately stored spectacle lens blanks or respectively of the spectacle lens semifinished products or respectively of the spectacle lens finished products can be used for manufacturing a finished, edged spectacle lens. For this purpose, in each case proceeding from the center of the spectacle lens blank or respectively of the spectacle lens semifinished product or respectively of the spectacle lens finished product, an envelope curve is applied virtually on at least one surface of the spectacle lens blank or respectively of the spectacle lens semifinished product or respectively of the spectacle lens finished product, which has the effect of the at least one defect lying outside the envelope curve. The center of the spectacle lens blank or respectively of the spectacle lens semifinished product or respectively of the spectacle lens finished product is that point on that surface on which the envelope curve corresponding to the area centroid of the spectacle lens blank or respectively of the spectacle lens semifinished product or respectively of the spectacle lens finished product is defined virtually. Particularly typically, the abstract data set of edging data of category 3 is defined on the basis of the boxing system such that in each case, typically in line with respective spectacle frame fashion, typically at least 47%, more typically at least 54%, particularly typically at least 66% and very particularly typically at least 71% of the intermediately stored spectacle lens blanks or respectively of the spectacle lens semifinished products or respectively of the spectacle lens finished products can be used for manufacturing a finished, edged spectacle lens. The boxing system is based on a rectangle formed by the horizontal and vertical tangents to the outermost edges of the spectacle lens finished product or of the spectacle lens semifinished product or of the spectacle lens blank; in this respect, see also DIN EN ISO 13666:2013-10, paragraph 5.1. Alternatively, the abstract data set of edging data of category 3 may also be defined on the basis of an envelope curve which is respectively present on a spectacle lens blank, a spectacle lens semifinished product or a spectacle lens finished product and in which, typically in line with respective spectacle frame fashion, typically at least 47%, more typically at least 54%, particularly typically at least 66% and very particularly typically at least 71% of the intermediately stored spectacle lens blanks or respectively of the spectacle lens semifinished products or respectively of the spectacle lens finished products can be used for manufacturing a finished, edged spectacle lens.

When classifying the spectacle lens blank or respectively the spectacle lens semifinished product or respectively the spectacle lens finished product in one of categories 1 to 4, the position of the at least one defect should typically be taken into account.

If, in the case of a spectacle lens blank, at least one defect is situated on or near the front surface of the spectacle lens blank and/or at least one defect is situated on or near the back surface of the spectacle lens blank, then the spectacle lens blank can be processed further or be included in an intermediate store, provided that all defects according to at least one data set of edging data from category 1 or 3 are situated or can be positioned virtually outside the region to be fitted into a spectacle frame, i.e., provided that the defects are situated or can be positioned virtually in a region of the spectacle lens blank which is removed anyway during edging. Alternatively or additionally, such a defect according to a data set of prescription data, typically a concrete data set of prescription data, can be removed by mechanical processing of the front surface and/or of the back surface. If this is not the case, the spectacle lens blank is rejected according to category 4. Edging is preceded, of course, by the spectacle lens blank being converted into a spectacle lens finished product having two optically effective target surfaces.

If, in a spectacle lens blank, at least one defect is situated within the spectacle lens blank, i.e., in the volume between front surface and back surface, the at least one defect according to at least one data set of edging data according to category 1 or 3 can be disregarded during the further processing or can be rejected according to category 4. Alternatively, it is possible to remove the at least one defect according to at least one data set of prescription data, typically a concrete data set of prescription data, by mechanical processing of the front surface and/or of the back surface and according to at least one data set of edging data according to category 1. If this is not possible, the spectacle lens blank is rejected according to category 4. In this case, too, edging is preceded by the spectacle lens blank being converted into a spectacle lens finished product having two optically effective target surfaces.

If, in a spectacle lens semifinished product, at least one defect is situated on the optically effective target surface, then the spectacle lens semifinished product can be processed further or be included in an intermediate store, provided that all defects situated on the optically effective target surface according to at least one data set of edging data from category 2 or 3 are situated or can be positioned virtually outside the region to be fitted into a spectacle frame, i.e., provided that the defects are situated or can be positioned virtually in a region of the spectacle lens semifinished product which is removed anyway during edging. If this is not the case, the spectacle lens semifinished product is rejected according to category 4. Edging is preceded, of course, by the spectacle lens semifinished product being converted into a spectacle lens finished product.

If, in a spectacle lens semifinished product, at least one defect is situated on or beneath the surface opposite the optically effective target surface, the at least one defect according to at least one data set of edging data according to category 2 or 3 can be disregarded during the further processing. Alternatively, it is possible to remove this defect according to at least one data set of prescription data, typically a concrete data set of prescription data, either by mechanical processing of the opposite surface whilst maintaining the second optically effective target surface and/or according to at least one data set of edging data according to category 2. If this is not possible, the spectacle lens semifinished product is rejected according to category 4.

If, in a spectacle lens semifinished product, at least one defect is situated beneath the optically effective target surface, it is possible to mechanically process the spectacle lens semifinished product according to at least one data set of prescription data according to category 2 on the surface opposite the optically effective target surface, whilst maintaining the second optically effective target surface. If the at least one defect is removed by the mechanical processing of the surface opposite the optically effective surface, the spectacle lens semifinished product need not be rejected according to category 4.

If the optionally present coating of the optically effective target surface of the spectacle lens semifinished product has at least one defect, the coated spectacle lens semifinished product can be used further according to at least one data set of edging data according to category 2 or 3. However, if the coating has at least one defect in a region of the optically effective target surface which is not removed during final edging after conversion into a spectacle lens finished product, the spectacle lens semifinished product is rejected according to category 4.

If at least one defect is situated on at least one optically effective target surface of a spectacle lens finished product, the spectacle lens finished product can be processed further according to at least one data set of edging data of category 2 or 3. If at least one defect is situated on at least one optically effective target surface of the spectacle lens finished product within a region that is not removed after final edging, the spectacle lens finished product is rejected according to category 4.

If at least one defect is situated within the spectacle lens finished product, i.e., between the two optically effective target surfaces, the spectacle lens finished product can be used further according to at least one data set of edging data from category 2 or 3. If at least one defect is situated between the optically effective target surfaces of the spectacle lens finished product within a region that is not removed after final edging of the spectacle lens finished product, the spectacle lens finished product is rejected according to category 4.

If the at least one optionally present coating of the at least one optically effective target surface of the spectacle lens finished product has at least one defect, the coated spectacle lens finished product can be used further according to at least one data set of edging data from category 2 or 3. If at least one defect of the at least one coating of at least one optically effective target surface of the spectacle lens finished product is situated in a region that is not removed after final edging of the coated spectacle lens finished product, the coated spectacle lens finished product is rejected according to category 4.

In one exemplary embodiment of the disclosure, the optically effective target surface of a spectacle lens semifinished product or respectively at least one of the optically effective target surfaces of the spectacle lens finished product can also be mechanically processed. In this exemplary embodiment, accordingly, spectacle lens semifinished products or respectively spectacle lens finished products can be processed according to at least one data set of prescription data, typically a concrete data set of prescription data, and/or according to at least one data set of edging data according to category 2.

In the context of this disclosure, mechanical processing encompasses milling and/or grinding and/or turning and/or polishing of at least one of the surfaces of the spectacle lens blank or respectively of the spectacle lens semifinished product or respectively, if required, of at least one of the optically effective target surfaces of the spectacle lens finished product.

In one exemplary embodiment of the disclosure, as an alternative to rejecting the spectacle lens blank or respectively the spectacle lens semifinished product or respectively the spectacle lens finished product according to category 4, a decision can be taken as to whether the at least one defect is possibly still acceptable for spectacle lenses to be produced in a lower price category and/or whether the at least one defect is situated in a region of the finished spectacle lens, situated in a frame, or can be positioned virtually there, through which the wearer of spectacles generally does not look or only rarely looks. In the latter case, such an unused or little used region can be, for example, a zone having astigmatic imaging aberrations of a progressive lens or the outermost edge region of the finished spectacle lens.

The final edging of the spectacle lens finished product can be carried out by means of an automatic grinding machine or automatic milling machine, for example.

In one exemplary embodiment, in the method according to the disclosure, only spectacle lens blanks are used which have on the front surface and/or on the back surface no defect within a circle having a radius of at least 60 mm, typically at least 48 mm, more typically at least 36 mm, particularly typically at least 27 mm and very particularly typically at least 21 mm from the geometric midpoint of the spectacle lens blank. In this exemplary embodiment, in the method according to the disclosure, only spectacle lens semifinished products, which are optionally coated on the optically effective target surface, or respectively spectacle lens finished products, which are optionally coated on at least one optically effective target surface, are used which have in each case on the at least one optically effective target surface no defect within a circle having a radius of at least 60 mm, typically at least 48 mm, more typically at least 36 mm, particularly typically at least 27 mm and very particularly typically of at least 21 mm from the geometric midpoint of the spectacle lens semifinished product or of the spectacle lens finished product. In this exemplary embodiment, values mentioned above are correspondingly applicable to at least one defect of the optionally present at least one coating. Furthermore, in this exemplary embodiment, values presented above are applicable even if, instead of the midpoint, the distance visual point is employed in the case of monofocal spectacle lenses or the prism measurement point is employed in the case of multifocal/progressive spectacle lenses. The above radius of the circle, both for an optically effective target surface and for an optionally present coating of at least one optically effective target surface, describes the dimensions on the respective surface. Furthermore, indications above are applicable independently of whether only an edge region of the at least one defect or a complete defect is situated within the radius indicated.

The method according to the disclosure can be used both for spectacle lenses having no nominal dioptric power and for corrective spectacle lenses. A spectacle lens can furthermore fulfil various purposes, for example in order to be used in sunglasses, display workstation spectacles, makeup spectacles, protective goggles, diving mask, mask spectacles, shooting spectacles, magnifying spectacles, prismatic spectacles, 3D spectacles.

The method according to the disclosure comprises, in each case in the second step, identifying at least one defect of the spectacle lens blank (step b.) or of the spectacle lens semifinished product (step k.) or of the spectacle lens finished product (step t.). If no defect is ascertained, the spectacle lens blank or the spectacle lens semifinished product or the spectacle lens finished product is provided for later processing with at least one arbitrary data set of edging data according to one of categories 1 to 3. Such a spectacle lens blank or respectively such a spectacle lens semifinished product or respectively such a spectacle lens finished product without at least one defect can, for example just like spectacle lens blanks or respectively spectacle lens semifinished products or respectively spectacle lens finished products of category 3, be included in an intermediate store and be used for example for spectacles lenses to be produced in a particularly large spectacle frame. Alternatively, such spectacle lens blanks or spectacle lens semifinished products or spectacle lens finished products without at least one defect, without knowledge of edging data, can be passed to an optician. A spectacle lens blank or a spectacle lens semifinished product or a spectacle lens finished product in each case without a defect, in the third step of the method according to the disclosure, is separated from a spectacle lens blank (step c.) or a spectacle lens semifinished product (step l.) or a spectacle lens finished product (step s.) in each case having at least one defect.

If at least one defect has been identified on and/or in a spectacle lens blank or respectively on and/or in a spectacle lens semifinished product or respectively on and/or in a spectacle lens finished product or respectively the at least one optionally present coating of the optically effective target surface of the spectacle lens semifinished product or respectively the at least one optionally present coating of at least one optically effective target surface of the spectacle lens finished product, the position and/or size of the respective defect are/is detected in each case in the fourth step of the method according to the disclosure.

In one exemplary embodiment of the disclosure, determining the position of the at least one defect within, i.e., in the volume of, the spectacle lens blank or respectively on or beneath the optically effective target surface of the spectacle lens semifinished product or respectively on or beneath at least one of the optically effective target surfaces of the spectacle lens finished product is carried out with at the same time the aid of the geometric midpoint of the spectacle lens blank or respectively of the spectacle lens semifinished product or respectively of the spectacle lens finished product and a further, previously defined reference point of a marking. The two points mentioned above thus define a coordinate system for the respective spectacle lens blank or for the respective spectacle lens semifinished product or the respective spectacle lens finished product. The marking can be, for example, a 1D barcode or a 2D barcode, as can be found for example on the back surface of many spectacle lens semifinished products, or any other marking that can be applied for example by casting, tracing, printing, (laser) engraving and/or scribing on the front surface or on the back surface of a spectacle lens blank or respectively on an optically effective target surface and/or on the surface of the spectacle lens semifinished product that is opposite the optically effective target surface, or respectively on an optically effective target surface of the spectacle lens finished product. Typically, in this exemplary embodiment, determining the at least one defect is carried out with at the same time the aid of the geometric midpoint of the spectacle lens blank or respectively of the spectacle lens semifinished product or respectively of the spectacle lens finished product and a further, previously defined point of a 2D barcode, typically of a DataMatrix code, particularly typically a DataMatrix code according to ISO/IEC 16022:2006.

In one further exemplary embodiment, determining the position of the at least one defect within, i.e., in the volume of, the spectacle lens blank or respectively on or beneath the optically effective target surface of the spectacle lens semifinished product or respectively on or beneath at least one of the optically effective target surfaces of the spectacle lens finished product is carried out on the basis of the coordinate system which is defined by a DataMatrix code and which is spanned by the closed edges thereof.

In one exemplary embodiment of the disclosure, determining the position of the at least one defect within, i.e., in the volume of, the spectacle lens blank or respectively on or beneath the optically effective target surface of a spectacle lens semifinished product or respectively on or beneath at least one of the optically effective target surfaces of a spectacle lens finished product is carried out during the centering of the spectacle lens blank or respectively of the spectacle lens semifinished product or respectively of the spectacle lens finished product in each case on the block piece required for the further processing. In this case, the spectacle lens blank or respectively the spectacle lens semifinished product or respectively the spectacle lens finished product is arranged on the block piece typically in a decentered manner such that the at least one defect is no longer located in a finished, edged spectacle lens on account of either at least one data set of prescription data, typically a concrete data set of prescription data, and/or at least one data set of edging data. By way of example, the arrangement described above is implemented in such a way that the at least one defect is located outside the optically effective target surface to be processed and/or that at least one defect is located at a position at which material removal sufficient for completely removing the defect is provided on the basis of the at least one data set of prescription data, typically a concrete data set of prescription data. In this exemplary embodiment, the use of a coordinate system for locating the at least one defect is optional because the surface to be processed of the spectacle lens blank or respectively of the spectacle lens semifinished product or respectively of the spectacle lens finished product and thus also the position of the at least one defect relative thereto are already defined by virtue of the provision of the block piece. For the case where the spectacle lens semifinished product used in this exemplary embodiment on the surface to be blocked has no spherical surface, an undesired prismatic power—possibly occurring as a result of the decentered provision of the block piece—of the spectacle lens to be thus produced may need to be compensated for by techniques professionally familiar to the person skilled in the art, for instance the use of prism rings, a rotating wedge device or corresponding driving of the grinding machine.

In a further exemplary embodiment of the disclosure, the position of the at least one defect within, i.e., in the volume of, the spectacle lens blank or respectively on or beneath the optically effective target surface of the spectacle lens semifinished product or respectively on or beneath at least one of the optically effective target surfaces of the spectacle lens finished product can be specified as a radius in mm from the geometric midpoint of the spectacle lens blank or respectively of the spectacle lens semifinished product or respectively of the spectacle lens finished product. In this exemplary embodiment, the radius is typically determined proceeding from that point of the respective defect which is closest to the geometric midpoint In a further exemplary embodiment of the disclosure, the position of the at least one defect on the optically effective target surface of the spectacle lens semifinished product or respectively on at least one of the optically effective target surfaces of the spectacle lens finished product can be determined on the basis of at least one of the two permanent markings, which a finished spectacle lens must have according to DIN EN ISO 8980-2:2004, by assigning a direction vector to the respective position of a defect on the same optically effective target surface or on the basis of a coordinate system. This exemplary embodiment does not allow virtual displacement of the final shape of the spectacle lens to be produced on the optically effective target surface since the distance visual point of a monofocal spectacle lens or the prism reference point of a multifocal lens is already defined by the permanent markings. However, here, too, at least one data set of edging data according to either of categories 2 and 3 can be present, with which the at least one defect lies outside the spectacle lens to be produced. If for example at least one defect is situated near the distance visual point of a monofocal spectacle lens or near the prism reference point of a multifocal lens, in this exemplary embodiment, although the spectacle lens to be produced cannot be displaced into a non-defective region of the spectacle lens semifinished product or respectively of the spectacle lens finished product, the spectacle lens semifinished product or respectively the spectacle lens finished product can, if appropriate, nevertheless be used for very small and/or very narrow spectacle lenses to be produced.

Possibilities presented above for determining at least one defect on the optically effective target surface of the spectacle lens semifinished product or respectively at least one of the optically effective target surfaces of the spectacle lens finished product can analogously be used for determining at least one defect of the at least one optionally present coating of the optically effective target surface of the spectacle lens semifinished product or respectively of at least one of the optically effective target surfaces of the spectacle lens finished product.

In a further exemplary embodiment of the disclosure, detecting the position of the at least one defect within, i.e., in the volume of, the spectacle lens blank or respectively within, i.e., in the volume of, the spectacle lens semifinished product or respectively within, i.e., in the volume of, the spectacle lens finished product can be carried out for example by means of a three-dimensional vector or a three-dimensional coordinate tuple. Detecting the position of the at least one defect within a spectacle lens blank makes it possible to decide whether a spectacle lens blank, as already described above, can be processed further according to at least one data set of prescription data, typically a concrete data set of prescription data, and at least one data set of edging data or whether the spectacle lens blank must be rejected. Detecting the position of at least one defect within a spectacle lens semifinished product makes it possible to decide whether a spectacle lens semifinished product can be processed further according to at least one data set of edging data and/or according to at least one data set of prescription data, typically a concrete data set of prescription data, typically after mechanical processing of the surface opposite the optically effective target surface, or whether the spectacle lens semifinished product must be rejected. Detecting the position of the at least one defect within a spectacle lens finished product makes it possible to decide whether a spectacle lens finished product, as already described above, can be processed further according to at least one data set of edging data or whether the spectacle lens finished product must be rejected. Detecting the position of the at least one defect of at least one optional coating of the optically effective target surface of the spectacle lens semifinished product or respectively of at least one optional coating of at least one of the optically effective target surfaces of the spectacle lens finished product makes it possible to decide whether a coated spectacle lens semifinished product or a coated spectacle lens finished product can be processed further according to at least one data set of edging data, as described above, or must be rejected. In the cases of this exemplary embodiment as just mentioned, the further processing does not preclude intermediate storage according to category 3.

In a further exemplary embodiment of the disclosure, by means of a recording device, typically a camera, it is possible to record a first image of the at least one defect on or in a spectacle lens blank, on or in a spectacle lens semifinished product or on or a spectacle lens finished product, wherein a coordinate system is typically stationary with respect to a holding device for the spectacle lens blank, for the spectacle lens semifinished product or the spectacle lens finished product. In this case, the at least one defect is recorded in a first recording position, referenced with respect to the holding device, from a first recording direction with a first imaging beam path. At the same time, illumination light that is coaxial with the optical axis of the first imaging beam path impinges on the at least one defect in the first recording direction, wherein the illumination light passes through the at least one defect and is reflected back on itself after passing through the at least one defect, with the result that the illumination light once again passes through the at least one defect. Moreover, in this exemplary embodiment, at least one further image of the at least one defect is recorded in at least one further recording position, different than the first recording position and referenced with respect to the holding device, from at least one further recording direction different than the first recording direction with a further imaging beam path. In this case, illumination light that is coaxial with the optical axis of the further imaging beam path in turn impinges on the at least one defect in the at least one further recording direction, which illumination light passes through the at least one defect and is reflected back on itself after passing through the at least one defect, with the result that the illumination light once again passes through the at least one defect. In this exemplary embodiment, the spatial coordinates of the at least one defect are then reconstructed from image coordinates of the at least one defect in the first image and from image coordinates of the at least one defect in the at least one further image.

Alternatively, it is possible to determine the position of at least one defect within a spectacle lens blank or respectively a spectacle lens semifinished product or respectively a spectacle lens finished product according to the method disclosed in claim 1 of WO 2011/117539 A1.

In one exemplary embodiment of the disclosure, it is also possible to detect the type of the at least one defect, i.e., it is possible to detect, for example, whether a color deviation or an inclusion is involved. Detecting the type of the at least one defect is of importance in particular for deciding whether a tolerable defect, for example for spectacle lenses in a lower price category, is involved. A tolerable defect can for example also be a defect which is situated in a region of the spectacle lens that is not used by the wearer of spectacles, for example in the edge region of the spectacle lens. Furthermore, detecting the type of the at least one defect allows conclusions to be drawn about the position of the defect. In this regard, it may be assumed, for example, that there is a scratch on one of the surfaces or there is a bubble within a spectacle lens blank or respectively a spectacle lens semifinished product or respectively a spectacle lens finished product.

Detecting the type of the at least one defect is important in the case of a color deviation, for example, insofar as only spectacle lenses whose color deviation in the color space does not exceed a predetermined color deviation are typically used in a spectacle frame. Otherwise two differently colored spectacle lenses in a spectacle frame might be perceived as disturbing or unattractive by an observer. The same is correspondingly also applicable to spectacle lenses which are provided with at least one antireflection layer and which are typically not present with different reflection colors in one and the same spectacle frame or whose differences in the reflection color typically do not exceed a predetermined deviation. The color deviation or a deviation in the reflection color can be detected in an automated manner. Furthermore, detecting a color deviation also plays a role if it is to be ensured that a spectacle lens has a specified color and/or a specified reflection color, i.e., in each case is present within a specified color space.

Besides the position of the at least one defect, respectively in the fourth step of the method according to the disclosure, i.e., in step d. in the case of a spectacle lens blank, in step m. in the case of a spectacle lens semifinished product and in step t. in the case of a spectacle lens finished product, the size of the at least one defect can also be detected. Thus, this parameter can also be taken into account during the comparison of the at least one data set of edging data and the subsequent assignment to a category.

For determining the size of the at least one defect, it is unimportant here whether the spectacle lens blank, the spectacle lens semifinished product, the spectacle lens finished product, or an optionally present at least one coating of the optically effective target surface of the spectacle lens semifinished product or respectively of one of the optically effective target surfaces of a spectacle lens finished product has at least one defect. The size of the at least one defect can be detected for example on a surface or on one of the optically effective target surfaces or on a coating optionally present thereon, as a circle covering or encompassing the defect, wherein the circle can be detected for example by way of its radius and the position of its midpoint. Typically, the at least one defect on at least one surface or on an optically effective target surface or a coating optionally present thereon can also be detected and described in terms of its actual geometry—this reduces the inaccuracy as a result of an excessively large circle. Detecting the size of the at least one defect on at least one surface or on an optically effective target surface or on a coating optionally present thereon can be described by a plurality of overlapping circles, for example, which describe the at least one defect more accurately than a larger circle covering the entire defect and further regions of the surface or of the at least one optically effective target surface or of the coating optionally present thereon which in each case have no defect.

In accordance with the method according to the disclosure, the spectacle lens blank comprising at least one defect or respectively the spectacle lens semifinished product comprising at least one defect or respectively the spectacle lens finished product comprising at least one defect is compared in each case with at least one provided data set of edging data. In the course of this comparison of the at least one data set of edging data with the spectacle lens blank or respectively the spectacle lens semifinished product or respectively the spectacle lens finished product, it is ascertained whether a spectacle lens to be produced for a predefined spectacle frame can be realized on the spectacle lens blank, spectacle lens semifinished product or spectacle lens finished product such that the at least one defect becomes located in a region that is cut away during edging as a result of the processing in accordance with the at least one data set of edging data present. In the case of a spectacle lens blank, at least one data set of prescription data, typically a concrete data set of prescription data, is furthermore taken into account for this purpose. Typically, this realization is also implemented by virtual displacement of the spectacle lens to be produced for a predefined spectacle frame on the spectacle lens blank, on the spectacle lens semifinished product or respectively on the spectacle lens finished product. Virtual displacement of the spectacle lens predefined for a predefined spectacle frame on the spectacle lens blank, spectacle lens semifinished product or respectively spectacle lens finished product thus makes it possible that a spectacle lens blank, spectacle lens semifinished product or respectively spectacle lens finished product having at least one defect may not need to be rejected, rather the production of a finished edged spectacle lens without defects is accomplished. In the case of a spectacle lens semifinished product, this virtual displacement according to a data set of edging data can be carried out as an alternative or in addition to the mechanical processing according to a data set of prescription data, typically a concrete data set of prescription data, typically of the surface opposite the optically effective target surface. In the case of a spectacle lens finished product, this virtual displacement can be carried out as an alternative or in addition to the mechanical processing according to a data set of prescription data, typically a concrete data set of prescription data, of one of the optically effective target surfaces.

In the respectively last step of the method according to the disclosure, the spectacle lens blank or respectively the spectacle lens semifinished product or respectively the spectacle lens finished product is assigned to one of the categories described above.

If it has been recognized that the spectacle lens blank can be processed further with at least one data set of prescription data and at least one data set of edging data according to category 1, the spectacle lens blank is assigned to processing with these two data sets.

If it has been recognized that the spectacle lens semifinished product or respectively the spectacle lens finished product can be processed further with at least one present concrete data set of edging data according to category 2, such that the at least one defect is removed during final edging, the spectacle lens semifinished product or respectively the spectacle lens finished product is assigned to processing with this data set of edging data.

If it has been recognized that the spectacle lens blank or respectively the spectacle lens semifinished product or respectively the spectacle lens finished product can be processed further with at least one abstract data set of edging data according to category 3, the spectacle lens blank, the spectacle lens semifinished product or respectively the spectacle lens finished product is assigned to an intermediate storage inventory.

In one exemplary embodiment of the disclosure, instead of the assignment to an intermediate storage inventory, pending orders for the production of a spectacle lens can also be checked in respect of whether a spectacle lens blank to be assigned to category 3 or respectively a spectacle lens semifinished product or spectacle lens finished product to be assigned to category 3 is suitable for this. By way of example, in this exemplary embodiment, before storage in an intermediate store, at least 100 pending orders for the production of a spectacle lens can be checked to establish whether a matching data set of edging data and/or a matching data set of prescription data can thereby be realized with exclusion of the at least one defect.

If it has been recognized that a spectacle lens blank or respectively a spectacle lens semifinished product or respectively a spectacle lens finished product cannot be assigned to any of the categories 1, 2 or 3, the spectacle lens blank or respectively the spectacle lens semifinished product or respectively the spectacle lens finished product is rejected according to category 4. One exception to this may be formed by spectacle lens blanks or respectively spectacle lens semifinished products or respectively spectacle lens finished products having at least one tolerable defect, i.e., a defect which is still present even in the finished spectacle lens situated in the spectacle frame. Tolerable defects, as already mentioned above, may still be present, if appropriate, in spectacle lenses in a lower price category.

In one exemplary embodiment of the disclosure, during the production of a spectacle lens, firstly it is possible to check whether the intermediate store contains a spectacle lens blank, a spectacle lens semifinished product or respectively a spectacle lens finished product which can be used to realize a spectacle lens with at least one data set of edging data. If this is not the case, a new or newly produced spectacle lens blank or respectively a new or newly produced spectacle lens semifinished product or respectively a new or newly produced spectacle lens finished product must be used for the production of the spectacle lens. As an alternative to using a new spectacle lens blank or respectively a spectacle lens semifinished product or respectively a spectacle lens finished product, it is also possible to wait for a predefined time, for example 24 hours, until a suitable spectacle lens blank or respectively a suitable spectacle lens semifinished product or respectively a suitable spectacle lens finished product has been assigned to the intermediate store—the proportion of spectacle lens blanks or respectively spectacle lens semifinished products or respectively spectacle lens finished products to be newly produced can be reduced in this way. The waiting can make sense for example for the production of very small and/or very narrow spectacle lenses which can be realized even by means of spectacle lens semifinished products or respectively spectacle lens finished products having at least one defect near the distance visual point in the case of monofocal lenses or near the prism measurement point in the case of multifocal lenses. In the case of small and/or narrow spectacle lenses to be produced, the possibility of alternative arrangements on the optically effective target surface of a spectacle lens semifinished product or respectively at least one of the optically effective target surfaces of a spectacle lens finished product is again higher than in the case of a large spectacle lens to be produced, which often has to utilize a large portion of the optically effective target surface of a spectacle lens semifinished product or respectively a large portion of at least one of the optically effective target surfaces of a spectacle lens finished product.

In a further exemplary embodiment of the disclosure, spectacle lenses can be produced according to the method according to the disclosure for various requirements, wherein the spectacle lenses have different zones on the spectacle lens, in which different requirements can be made in respect of quality. By way of example, an aberration that is not noticeable in a disturbing way to the wearer of spectacles himself/herself can be accepted in a certain region of a finished edged spectacle lens. Thus, if at least one defect becomes located in such an acceptance zone, a spectacle lens blank, spectacle lens semifinished product or spectacle lens finished product respectively having at least one defect can nevertheless be used—typically depending on the type and severity of the defect. As a result, it is possible to use even spectacle lens blanks, spectacle lens semifinished products or respectively spectacle lens finished products respectively having at least one defect which remain on and/or in the finished spectacle lens situated in a spectacle frame. Such acceptance zones can be, for example, zones having astigmatic imaging aberrations on both sides of the progressive channel of a progressive lens, zones having relatively large residual astigmatic and/or spherical aberrations or regions outside the central visual regions, for example at a temporal position in the case of sports lenses wrapping extensively around the head.

In a further exemplary embodiment of the present disclosure, detecting the at least one defect comprises detecting the type and/or the severity of the defect. This information can be used, for example, to limit the residence time in the intermediate store of category 3, that is to say that in particular a spectacle lens blank or a spectacle lens semifinished product or a spectacle lens finished product respectively having at least one defect classified as "serious", which can nevertheless be used according to at least one data set of edging data for the production of a spectacle lens, is rejected according to category 4 more rapidly than a spectacle lens blank or a spectacle lens semifinished product or a spectacle lens finished product respectively having a defect classified as less "serious." In this exemplary embodiment, for example two classifications are conceivable for the assessment of at least one defect:

1. according to position and/or size of the defect: the more central, the more serious the defect,
2. depending on type and/or severity of the defect: slight striations for example may be acceptable for a spectacle lens in a lower price category, particularly if the striations are located in an acceptance zone of the spectacle lens.

Defects classified in this way can thus be accepted in a predetermined region, particularly if, for example, they are located only in an acceptance zone and not in a more central and more critical zone of the finished, edged spectacle lens.

In a further exemplary embodiment of the present disclosure, detecting the at least one defect also comprises assigning the at least one defect to an identification feature, e.g., to an identification number of the spectacle lens blank or respectively of the spectacle lens semifinished product or respectively of the spectacle lens finished product. This enables the unambiguous and comprehensible identification of a spectacle lens blank or respectively a spectacle lens semifinished product or respectively a spectacle lens finished product having in each case at least one defect. Furthermore, the identification number can for example also serve for defining a reference point. The identification number can be provided such that it remains and is readable even after edging on the finished spectacle lens, for example in the edge region thereof or as part of the permanent marking according to DIN EN ISO 8980-2:2004. The identification feature can be for example a 2D code, typically a matrix code, a barcode, an RFID code, or a serial number.

BRIEF DESCRIPTION OF THE DRAWINGS

The disclosure will now be described with reference to the drawings wherein.

DESCRIPTION OF EXEMPLARY EMBODIMENTS

FIGS. 1A-1D show a schematic two-dimensional plan view of a spectacle lens semifinished product or respectively a spectacle lens finished product having a defect and two planned data sets of edging data.

Figure 1A:
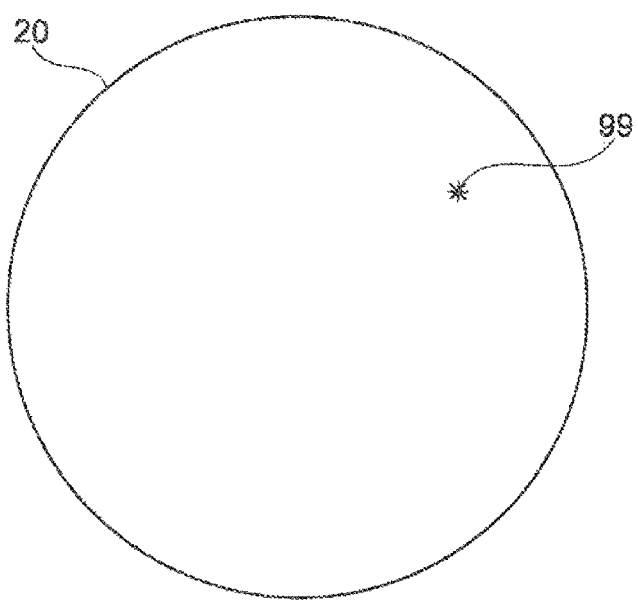
FIGS. 1A-1D show a schematic two-dimensional plan view of a spectacle lens semifinished product or respectively a spectacle lens finished product having a defect and two planned data sets of edging data.

FIG. 1A illustrates a spectacle lens semifinished product or respectively a spectacle lens finished product 20, on which a defect 99 is situated.

Figure 1B:
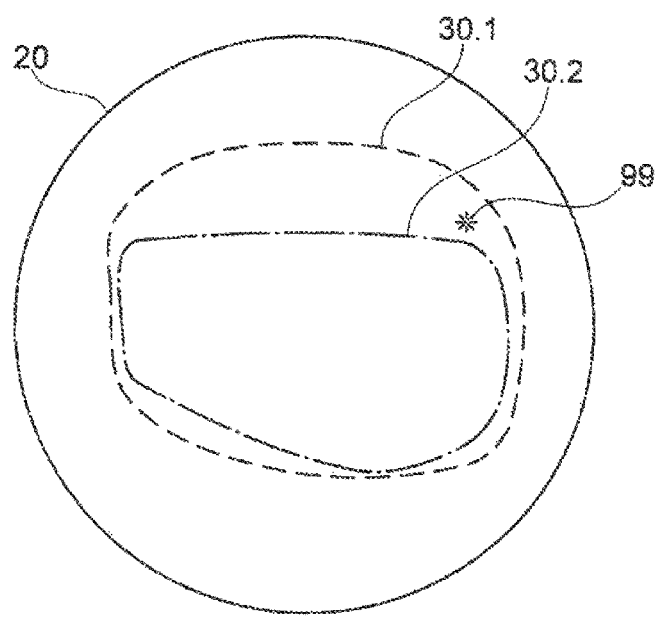

The spectacle lens semifinished product or respectively the spectacle lens finished product 20 having the defect 99 from FIG. 1A can be seen in FIG. 1B. The virtual positioning of a first finished spectacle lens in accordance with a first data set of edging data 30.1 is identified by the just dashed line and the virtual positioning of a second finished spectacle lens in accordance with a second data set of edging data 30.2 is identified by the dash-dotted line.

The defect 99 is situated within the first virtually positioned finished spectacle lens according to the first data set of edging data 30.1, and so it is not possible to produce this spectacle lens with this virtual positioning on the spectacle lens semifinished product or respectively the spectacle lens finished product 20. The virtual positioning of a second finished spectacle lens in accordance with a second data set of edging data 30.2 reveals, by contrast, that the region in which the defect 99 lies will be cut away during final edging. Therefore, the spectacle lens semifinished product or respectively the spectacle lens finished product 20 having the defect 99 can be used to manufacture a finished, edged spectacle lens according to the second data set of edging data 30.2.

Figure 1C:
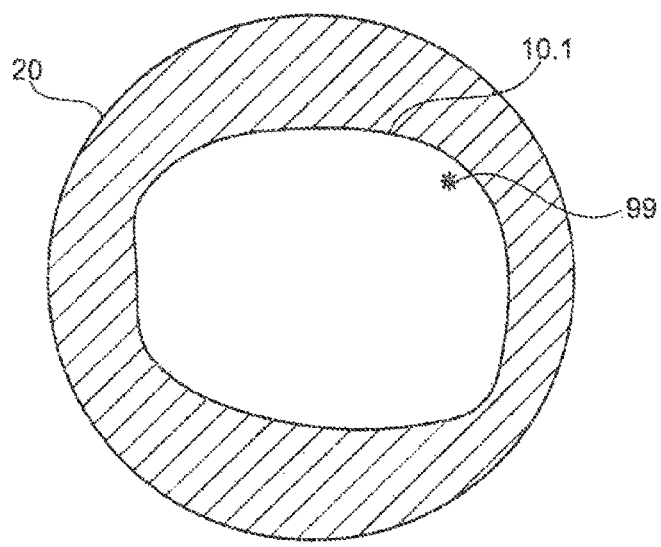

FIG. 1C illustrates the spectacle lens semifinished product or respectively the spectacle lens finished product 20 having the defect 99 from FIG. 1A with the spectacle lens 10.1 which would be cut out from the spectacle lens semifinished product or respectively the spectacle lens finished product 20 according to the first data set of edging data 30.1. The cut-away region of the spectacle lens semifinished product or respectively the spectacle lens finished product 20 is illustrated in a hashed manner. Since the defect 99 would remain on the finished, edged spectacle lens 10.1, this realization is not preferred. Since, in this case, the defect 99 would be situated in the edge region of the finished spectacle lens 10.1, such a spectacle lens could be offered, if appropriate, as a finished, edged spectacle lens in a lower price category.

Figure 1D:
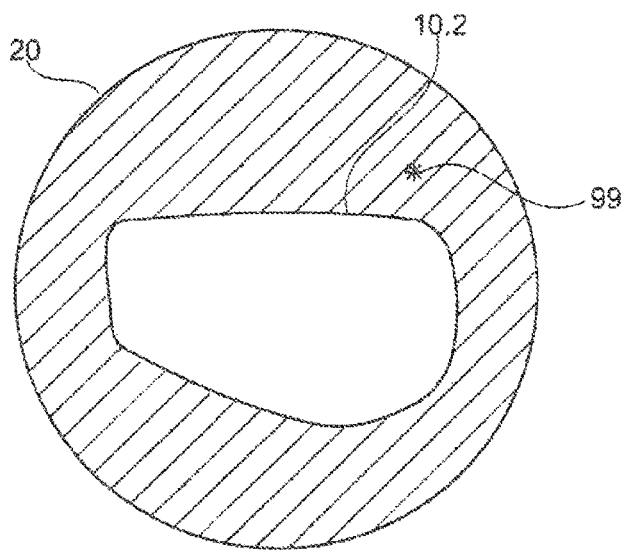

FIG. 1D illustrates the spectacle lens semifinished product or respectively the spectacle lens finished product 20 having the defect 99 from FIG. 1A with the spectacle lens 10.2 which would be cut out from the spectacle lens semifinished product or respectively the spectacle lens finished product 20 according to the second data set of edging data 30.2. The cut-away region of the spectacle lens semifinished product or respectively the spectacle lens finished product 20 is illustrated in a hashed manner. Since the defect 99 would no longer remain on the spectacle lens 10.2, this realization is possible.

According to the disclosure, a spectacle lens semifinished product that is optionally coated on the optically effective target surface or respectively a spectacle lens finished product 20 that is optionally coated on at least one of the optically effective target surfaces from FIG. 1A is examined for at least one defect after its respective manufacture, wherein the defect 99 can also be identified on the coating.

Data sets of edging data 30.1 and 30.2 are then received. The respective virtual positioning of the corresponding finished, edged spectacle lens on the spectacle lens semifinished product or respectively the spectacle lens finished product 20 is illustrated in FIG. 1B.

A comparison is then carried out to establish whether the first data set of edging data 30.1 is suitable in order to be able to manufacture a finished spectacle lens with the spectacle lens semifinished product or respectively the spectacle lens finished product 20 having the defect 99. It is evident from FIG. 1C that the finished spectacle lens 10.1 would bear the defect 99. Therefore, this spectacle lens semifinished product or respectively spectacle lens finished product 20 will typically not be used with this data set of edging data 30.1. It is evident from FIG. 1D that the finished spectacle lens 10.2 would not bear the defect 99. Therefore, the spectacle lens semifinished product or respectively the spectacle lens finished product 20 can be used with the data set of edging data 30.2 for manufacturing a finished spectacle lens.

FIGS. 2A-2D show a schematic two-dimensional plan view of a spectacle lens semifinished product or respectively a spectacle lens finished product 20 having a defect 99 and possible virtual positionings of a spectacle lens to be manufactured in variants 10.1 to 10.4 on the spectacle lens semifinished product or respectively the spectacle lens finished product 20.

Figure 2A:
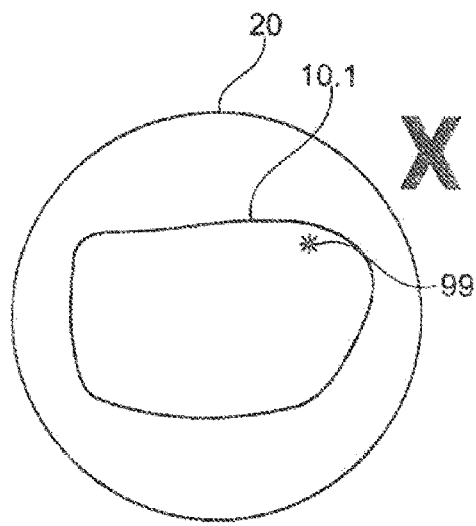
FIGS. 2A-2D show a schematic two-dimensional plan view of a spectacle lens semifinished product or respectively a spectacle lens finished product having a defect and possible virtual arrangements of the finished spectacle lens on the spectacle lens semifinished product or respectively the spectacle lens finished product.

FIG. 2A illustrates a spectacle lens semifinished product or respectively a spectacle lens finished product 20 having a defect 99. The defect 99 is located within the virtual positioning of the spectacle lens 10.1 to be manufactured. Therefore, it is not preferred to manufacture the spectacle lens 10.1 with this spectacle lens semifinished product or respectively spectacle lens finished product 20. As already mentioned above, the spectacle lens 10.1 can however also constitute a spectacle lens in a lower price category, in the case of which the defect 99 in the edge region is tolerated.

Figure 2B:
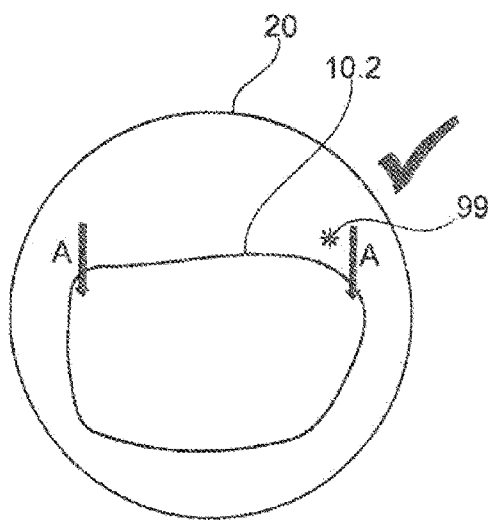

In FIG. 2B, the virtual positioning of the spectacle lens 10.1 to be manufactured from FIG. 2A has been displaced along the depicted arrows A and is now located in the virtual positioning of the spectacle lens 10.2 to be manufactured. According to at least one data set of edging data, this spectacle lens 10.2 to be manufactured from FIG. 1B is identical to the spectacle lens 10.1 to be manufactured from FIG. 1A, but this displacement according to FIG. 2B avoids the defect 99.

Figure 2C:
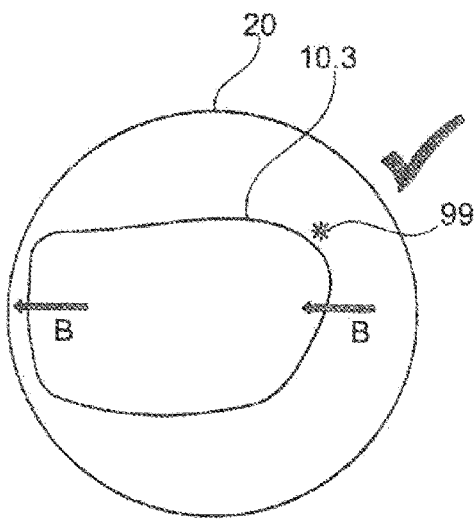

Equally, FIG. 2C alternatively illustrates a displacement along the arrows B, which chooses the virtual positioning of the spectacle lens 10.3 to be manufactured on the spectacle lens semifinished product or respectively the spectacle lens finished product 20 such that the defect 99 is not located within the spectacle lens 10.3.

Figure 2D:
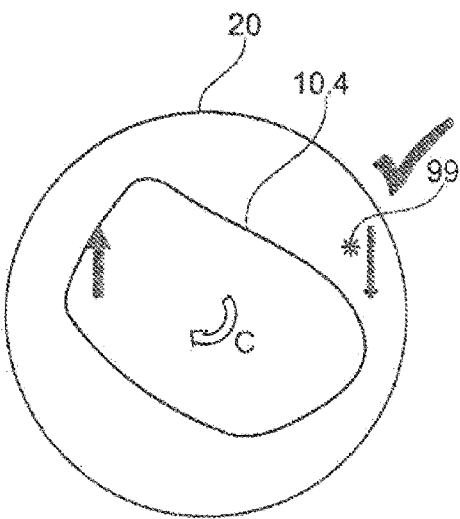

FIG. 2D shows that a rotation along the rotation axis C also makes it possible to find a virtual positioning for a spectacle lens 10.4 on the spectacle lens semifinished product or respectively the spectacle lens finished product in the case of which the defect 99 is avoided.

Which of the individual alternatives is chosen can be clarified in the respective step of comparison in accordance with the method according to the disclosure. In the course of choosing which of the individual alternatives from FIG. 2B, 2C, or 2D should be given preference, optionally at least one data set of prescription data can also be taken into account. Moreover, it is possible to take account of the optimization of the production steps for the individual variants.

Figure 3:
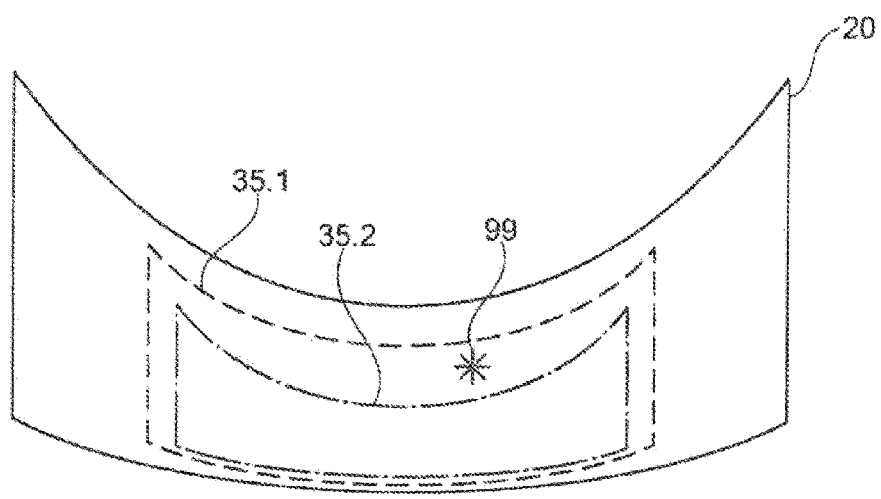
FIG. 3 shows a schematic two-dimensional cross section through a spectacle lens semifinished product having a defect and two planned data sets of prescription data, typically concrete prescription data.

FIG. 3 shows a schematic two-dimensional cross section through a spectacle lens semifinished product 20 having a defect 99 and two data sets of prescription data 35.1 and 35.2.

It is evident that the spectacle lenses to be produced according to both data sets of prescription data 35.1 and 35.2 lie completely within the spectacle lens semifinished product 20. It is also evident that in both cases the data sets of edging data include the defect 99 since, for both spectacle lenses to be produced, the defect 99 lies within the data sets of edging data of the spectacle lenses and will not be cut away during final edging. The data set of prescription data 35.1 includes the defect 99, while the data set of prescription data 35.2 does not include the defect 99. In the latter case, the defect 99 is removed during the mechanical processing according to the data set of prescription data 35.2.

By taking account of the data set of prescription data 35.2, it is thus possible to realize this spectacle lens to be produced with the spectacle lens semifinished product 20 despite the defect 99, even though it should have been rejected following simple consideration of the data set of edging data. The rejects can thus be reduced by taking account of the data sets of prescription data.

Figure 4A:
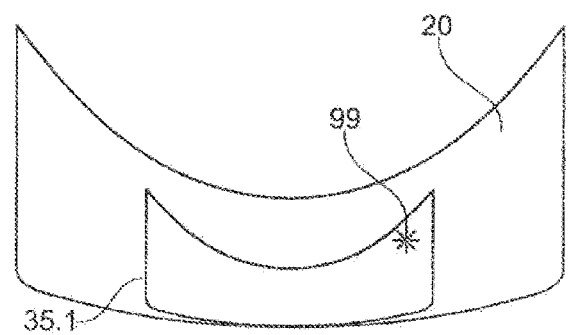
FIGS. 4A-4C show a schematic two-dimensional cross section through a spectacle lens semifinished product having a defect and one planned data set of prescription data, typically concrete prescription data, and possible virtual arrangements of the finished spectacle lens within the spectacle lens semifinished product.
Figure 4B:
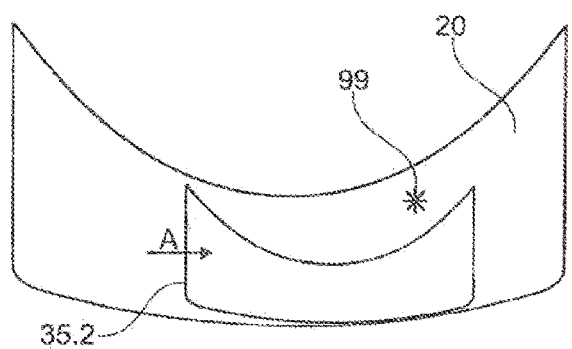
Figure 4C:
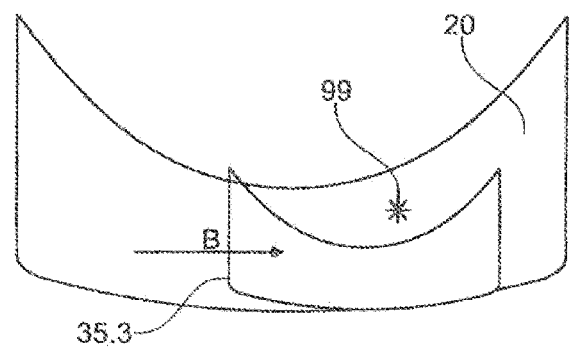

FIGS. 4A-4C show a schematic two-dimensional cross section through a spectacle lens semifinished product 20 having a defect 99, the data sets of prescription data 35.1 to 35.3 and possible virtual positionings within the spectacle lens semifinished product 20.

FIG. 4A reveals a data set of planned prescription data 35.1, according to which the spectacle lens to be produced is indeed located within the spectacle lens semifinished product 20, but the defect 99 will lie in the spectacle lens to be produced. Such a realization is not preferred. As already mentioned, spectacle lenses having a defect 99 in the edge region may possibly be offered as spectacle lenses in a lower price category.

In accordance with the method according to the disclosure, it is then possible to carry out a comparison as to whether it is possible to realize this spectacle lens to be produced in accordance with the data set of prescription data 35.1 within the spectacle lens semifinished product 20 such that the spectacle lens to be produced remains within the spectacle lens semifinished product 20 and at the same time the defect 99 is not located within this spectacle lens to be produced.

FIG. 4B illustrates a spectacle lens to be produced in accordance with the data set of prescription data 35.2, which spectacle lens was made possible by virtual displacement of the spectacle lens to be produced from FIG. 4A along the arrow A on the spectacle lens semifinished product 20.

FIG. 4C illustrates a spectacle lens to be produced in accordance with the data set of prescription data 35.3, which spectacle lens was attained by virtual displacement of the spectacle lens to be produced from FIG. 4A by displacement along the arrow B on the spectacle lens semifinished product.

Comparison of these possible arrangements of the spectacle lens to be produced according to FIGS. 4A, 4B, and 4C reveals that the spectacle lens to be produced according to FIGS. 4A and 4C is typically not realizable since in FIG. 4A the defect 99 lies in the edge region of the spectacle lens to be produced, while in FIG. 4C the spectacle lens to be produced is no longer located completely in the spectacle lens semifinished product 20. However, the spectacle lens to be produced according to FIG. 4B is situated within the spectacle lens semifinished product 20 and the defect 99 is not located within this spectacle lens to be produced. Thus, the spectacle lens to be produced is typically manufactured according to the data set of prescription data 35.2 according to FIG. 4B by means of the spectacle lens semifinished product 20.

Figure 5A:
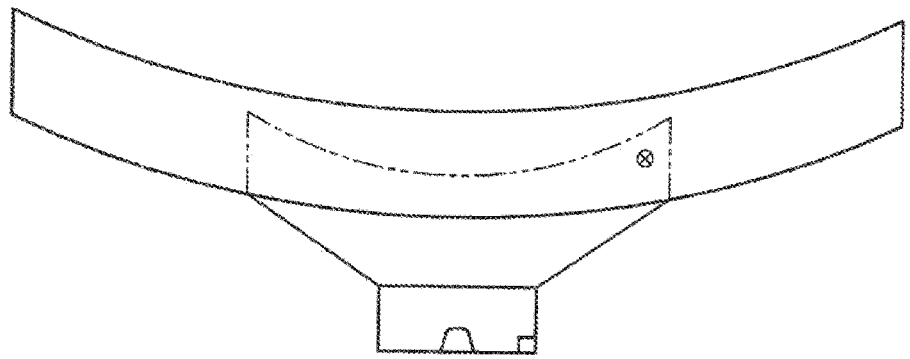
FIGS. 5A and 5B show a schematic two-dimensional cross section through a spectacle lens semifinished product or a spectacle lens finished product respectively having a defect, wherein the spectacle lens semifinished product is arranged on a block piece.

FIG. 5A shows a cross section of a spectacle lens semifinished product or spectacle lens finished product arranged on a block piece for the purpose of processing according to a data set of prescription data. In FIG. 5A, the spectacle lens semifinished product or respectively the spectacle lens finished product is arranged centrally on the block piece.

Figure 5B:
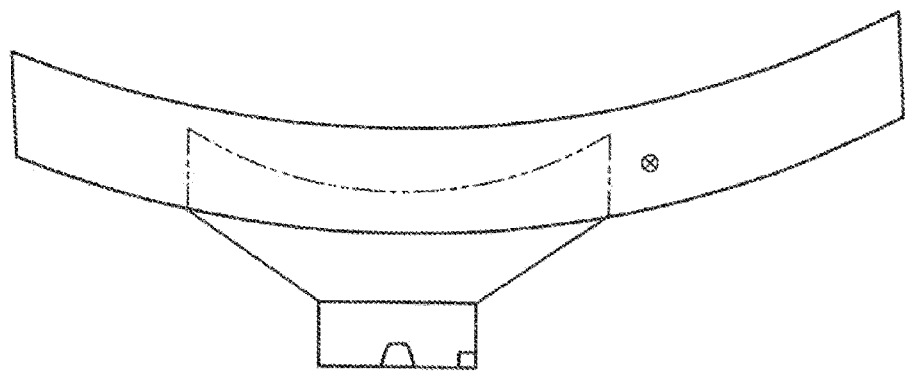

FIG. 5B shows a cross section of a spectacle lens semifinished product or spectacle lens finished product arranged on a block piece for the purpose of processing according to a data set of prescription data, wherein the spectacle lens semifinished product or respectively the spectacle lens finished product was arranged in a decentered manner in comparison with FIG. 5A. This decentration serves to avoid the defect.

The method according to the disclosure has provided a method by which production of spectacle lenses with reduced rejects can be realized.

The foregoing description of the exemplary embodiments of the invention illustrates and describes the present disclosure. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

LIST OF REFERENCE SIGNS

10 Spectacle lens
20 Spectacle lens semifinished product or spectacle lens finished product
30 Data set of edging data
35 Data set of prescription data
99 Defect

The invention claimed is:

1. A method of assigning a spectacle lens blank or a spectacle lens semifinished product or a spectacle lens finished product to a category, the method comprising:
  providing at least one of a plurality of spectacle lens blanks, a plurality of spectacle lens semifinished products, or a plurality of spectacle lens finished products;
  identifying a spectacle lens blank, a spectacle lens semifinished product, or a spectacle lens finished product having at least one defect;
  separating at least one of spectacle lens blanks, spectacle lens semifinished products, or spectacle lens finished products having the at least one defect from spectacle lens blanks, spectacle lens semifinished products, or spectacle lens finished products not having the at least one defect;
  detecting, with a recording device, a position, a size, or the position and the size of the at least one defect;
  providing a data set of edging data;
  comparing the data set of edging data with the detected defect; and
  assigning the at least one of the plurality of spectacle lens blanks, the plurality of spectacle lens semifinished products, or the plurality of spectacle lens finished products to a category depending on the comparison between the data set of edging data with the detected defect,
  wherein the spectacle lens to be produced, according to the at least one data set of edging data, is positioned virtually on an image recorded with the recording device on a part of the surface of the spectacle lens blank or on a part of an optically effective target surface of the spectacle lens semifinished product or on a part of one of an optically effective target surface of the spectacle lens finished product, which in each case has no defect.

2. The method as claimed in claim 1, wherein the assigned lens is the at least one spectacle semifinished product or spectacle lens finished product, and wherein the at least one spectacle lens semifinished product is coated on the optically effective target surface or the spectacle lens finished product is coated on at least one of an optically effective target surface.

3. The method as claimed in claim 1, wherein the assigned lens is the at least one spectacle semifinished product or spectacle lens finished product, and wherein identifying the at least one defect present in the spectacle lens semifinished product comprises identifying a defect of a coating of the optically effective target surface of the spectacle lens semifinished product.

4. The method as claimed in claim 1, wherein at least one data set of prescription data is provided in addition to the at least one data set of edging data.

5. The method as claimed in claim 4, wherein the assigned lens is the at least one spectacle semifinished product or spectacle lens finished product, and wherein the at least one data set of prescription data is compared with the at least one defect of the spectacle lens semifinished product, and the spectacle lens semifinished product is assigned to a category depending on this comparison.

6. The method as claimed in claim 1, wherein the assigned lens is the at least one spectacle semifinished product or spectacle lens finished product, and wherein identifying the at least one spectacle lens finished product having the at least one defect comprises identifying a defect of a coating of at least one optically effective target surface of the at least one spectacle lens finished product.

7. The method as claimed in claim 6, wherein at least one data set of prescription data is provided in addition to the at least one data set of edging data.

8. The method as claimed in claim 6, wherein the assigned lens is the at least one spectacle semifinished product or spectacle lens finished product, and wherein the at least one data set of prescription data is compared with the at least one defect of the spectacle lens finished product, and the spectacle lens finished product is assigned to a category depending on this comparison.

9. The method as claimed in claim 4, wherein the at least one data set of edging data is concrete or abstract.

10. The method as claimed in claim 9, wherein a concrete data set of edging data comprises a data set for a spectacle lens to be concretely manufactured and an abstract data set of edging data comprises a data set for a spectacle lens to be manufactured within the predetermined time t.

11. The method as claimed in claim 1, wherein the at least one data set of prescription data includes at least one parameter required for an optical correction effect of the spectacle lens.

12. A computer program product for assigning a spectacle lens blank or a spectacle lens semifinished product or a spectacle lens finished product to a category, the computer program product being stored on a non-transitory computer-readable storage medium and having instructions to:
provide at least one of a plurality of spectacle lens blanks, a plurality of spectacle lens semifinished products, or a plurality of spectacle lens finished products;
identify a spectacle lens blank, a spectacle lens semifinished product, or a spectacle lens finished product having at least one defect;
separate at least one of spectacle lens blanks, spectacle lens semifinished products, or spectacle lens finished products having the at least one defect from spectacle lens blanks, spectacle lens semifinished products, or spectacle lens finished products not having the at least one defect;
detect, with a recording device, a position, a size, or the position and the size of the at least one defect;
provide a data set of edging data;
compare the data set of edging data with the detected defect; and
assign the at least one of the plurality of spectacle lens blanks, the plurality of spectacle lens semifinished products, or the plurality of spectacle lens finished products to a category depending on the comparison between the data set of edging data with the at least one detected defect,
wherein the spectacle lens to be produced, according to the at least one data set of edging data, is positioned virtually on an image recorded with the recording device on a part of the surface of the spectacle lens blank or on a part of an optically effective target surface of the spectacle lens semifinished product or on a part of one of an optically effective target surface of the spectacle lens finished product, which in each case has no defect.

13. The method as claimed in claim 1, wherein at least one of the part of the optically effective target surface of the spectacle lens semifinished product or the part of the effective target surface of the spectacle lens finished product is coated.

14. The computer program product as claimed in claim 12, wherein at least one of the part of the optically effective target surface of the spectacle lens semifinished product or the part of the effective target surface of the spectacle lens finished product is coated.

* * * * *